United States Patent [19]

Nakajima

[11] 4,434,951
[45] Mar. 6, 1984

[54] FISHING REEL HAVING A MAGNETIC BRAKE AND NON-MAGNETIZABLE BEARING

[75] Inventor: Hideki Nakajima, Sakai, Japan

[73] Assignee: Shimano Industrial Company Limited, Osaka, Japan

[21] Appl. No.: 443,690

[22] Filed: Nov. 22, 1982

[30] Foreign Application Priority Data

Nov. 26, 1981 [JP] Japan .......................... 56-176133[U]

[51] Int. Cl.³ .............................................. A01K 89/02
[52] U.S. Cl. ........................... 242/84.52 B; 188/267; 310/90; 310/93; 310/105; 384/129
[58] Field of Search ................... 242/84.52 B, 84.1 R; 188/267; 310/90, 93, 105; 308/DIG. 5, DIG. 8; 384/129; 192/84 PM, 53 D

[56] References Cited

U.S. PATENT DOCUMENTS 2,550,861  5/1951  Ransom ...................... 242/84.52 B
3,167,672  1/1965  Tupper ............................. 310/90

FOREIGN PATENT DOCUMENTS 635116  4/1950  United Kingdom ......... 242/84.52 B

*Primary Examiner*—Billy S. Taylor
*Attorney, Agent, or Firm*—Stevens, Davis, Miller & Mosher

[57] ABSTRACT

A fishing reel which rotatably supports a spool shaft having a spool to a reel body through a pair of bearings and incorporates, into a bearing housing supporting one of the pair of bearings, a magnetic force brake which imparts a rotational resistance against free rotation of the spool shaft, has the bearing at the bearing housing incorporating the brake formed as a metallic bearing comprising a non-magnetic material.

6 Claims, 3 Drawing Figures

4,434,951

FISHING REEL HAVING A MAGNETIC BRAKE AND NON-MAGNETIZABLE BEARING

FIELD OF THE INVENTION

This invention relates to a fishing reel, and more particularly to a fishing reel rotatably supportig a spool shaft having a spool to a reel body through a pair of bearings.

BACKGROUND OF THE INVENTION

Generally, in this kind of fishing reel the spool is freely rotatable for casting, with the spool rotating at a higher speed than a fishing line drawn out of the spool causing backlash, whereby the line wound on the spool is entangled or caught in a gap between the spool and a reel frame. In order to solve this problem, a centrifugal brake usually is used to impart a predetermined rotational resistance to the spool. However, a sufficient braking effect has not been achieved with this type of brake and the centrifugal brake, which exerts the braking action by slidable contact of a brake shoe with a brake drum, may have its braking force changed due to wearing of the brake shoe.

There has been proposed a spool braking device using a magnet and a metallic conductor, one of them being rotatable together with the spool and the other being fixed to the reel body so that the rotating field of the rotating member generates an eddy current. Hence, the rotating member, due to Fleming's left-hand rule, is given a magnetic force against its rotation, thereby exerting a braking action on the spool.

This method can increase the braking effect and since there is no contact-portion at the brake member variations in the braking force can be eliminated. However, with this type of mechanism a bearing for the spool shaft becomes magnetized so that the magnetic flux links the bearing and the spool shaft which is made of a magnetic material of high strength, such as stainless steel, thereby increasing the rotational resistance against the rotation of the spool which is integral with the spool shaft.

DISCLOSURE OF THE INVENTION

An object of the invention is to provide a fishing reel simple in construction, inexpensive to produce, and which prevents magnetization of the bearing for the spool shaft and eliminates rotational resistance against the rotation of spool caused by bearing magnetization.

The fishing reel of the invention is so constructed that a magnet ring having a plurality of magnets is mounted on a bearing housing rotatably supporting the spool shaft through a bearing and an electric conductor opposite to the magnets is mounted to the spool shaft so as to form a magnetic force brake, and is characterized in that a metallic bearing of non-magnetic material is employed for the bearing at the brearing housing.

The above and other objects of the invention will become more apparent in the following detailed description which is provided in connection with the accompanying drawings.

DETAILED DESCRIPTION OF THE INVENTION

Figure 1:
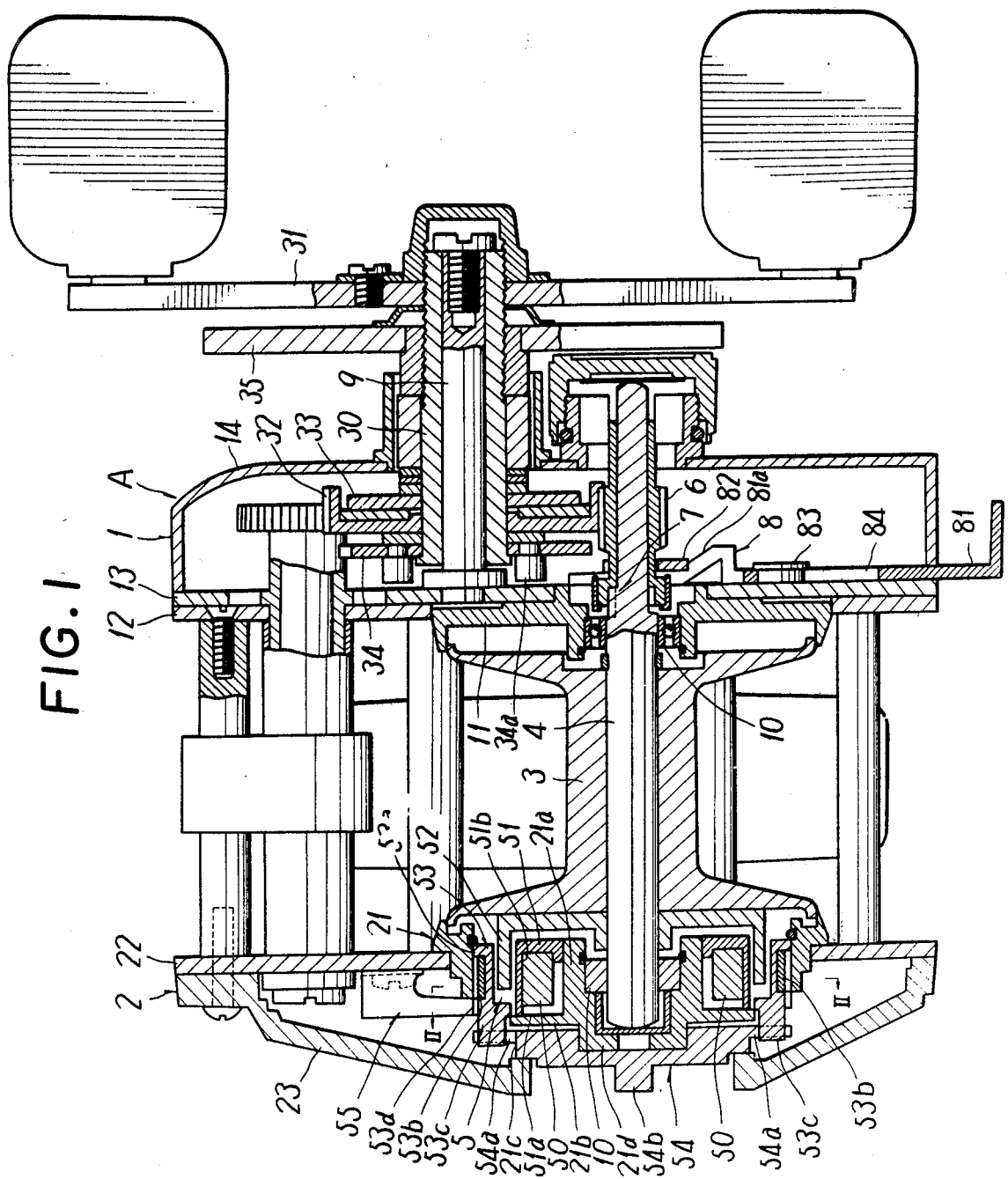
FIG. 1 is a cross-sectional plan view of an embodiment of a fishing reel of the invention.
Figure 2:
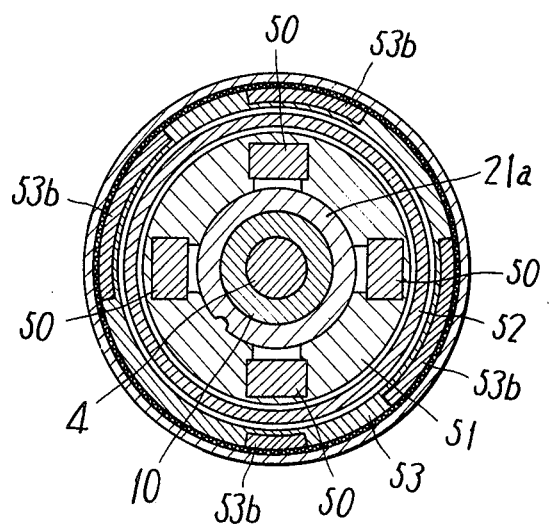
FIG. 2 is a sectional view taken on the line II—II in FIG. 1.
Figure 3:
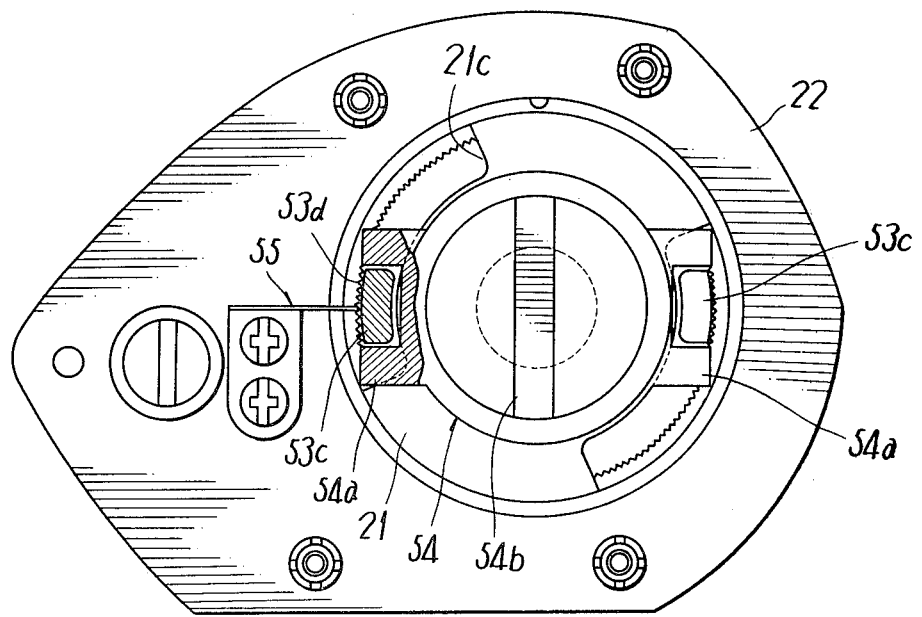
FIG. 3 is a partially cutaway side view of the FIG. 1 embodiment, in which a cover is removed.

Referring to FIG. 1, a reel body A comprises a pair of first and second side frames 1 and 2 opposite to each other and spaced by a predetermined interval, the first side frame 1 comprising a side plate 12 having at the center a bearing housing 11, a doubling plate 13 attached to the outside of the side plate 12, and a cup-shaped cover 14 attached to the outside of the doubling plate 13, the second side frame 2 comprising a side plate 22 having at the center a bearing housing 21 and a cup-shaped cover 23 attached to the outside of the side plate 22, the bearing housing 21 encasing therein a magnetic force brake 5 to be discussed below.

A spool shaft 4 having a spool 3 is journalled to the bearing housing 11 and 21 at the first and second side frames 1 and 2 through bearings 10 and extends outwardly at one axial end at the first frame 1 side to project therein so that the projection rotatably and slidably supports a pinion 6 constituting, together with a master gear 32, a drive mechanism to be discussed below. Between the pinion 6 and the spool shaft 4 is provided a clutch mechanism 7 which is engageable or disengageable by a clutch lever 81 provided at a clutch operating mechanism 8.

A handle shaft 30 is supported rotatably between the doubling plate 13 and the cover 14 through a support shaft 9, the handle shaft 30 projecting at one end outwardly from the cover 14 and fixing a handle 31 at the projection and supporting at the other end the master gear 32, a friction plate 33, and a return plate 34 with a plurality of clutch pins 34a, fitted onto the handle shaft 30 respectively.

The friction plate 33 and return plate 34 are fitted not-rotatably relative to but rotatable together with the handle shaft 30, the master gear 32 being fitted freely onto the handle shaft 30 to transmit a driving force therefrom to the master gear 32 through the friction plate 33.

In addition, a press-contact strength of friction plate 33 is adapted to be adjustable by an adjuster 35 screwing with the end of handle shaft 30.

The clutch mechanism 7 comprises flat faces provided at an intermediate portion of spool shaft 4 and a cylindrical portion having a not-round inner surface at the pinion 6, the cylindrical portion being engageable with the flat faces. The cylindrical portion at the pinion 6 disengages from the flat faces at the spool shaft 4 by operating the clutch operating mechanism 8, thereby making the spool shaft 4 and spool 3 fixed thereto freely rotatable.

The clutch operating mechanism 8 comprises a clutch yoke 82 holding the pinion 6 to urge it always in the direction of engaging the clutch mechanism 7, the bifurcated clutch lever 81 having an urging portion 81a to urge the clutch yoke 82, and the return plate 34. The clutch lever 81 is supported to the doubling plate 13 at the first side frame 1 in relation of moving in reciprocation perpendicularly to the spool shaft 4 through a pin 83 and an elongate slot 84, and is biased by a return spring (not shown) in the direction of backward movement, whereby the clutch lever 81 is pushed to axially move the clutch yoke 82 to thereby move the pinion 6 in the direction of disengaging the clutch mechanism 7 and the handle 31 is rotated to hit one clutch pin 34a at the return plate 34 against a contact (not shown) at the fore end of clutch lever 81 to thereby return the clutch lever 81 to the original pisition by virture of the return spring's force, thus moving the pinion 6 in the direction of engaging the clutch mechanism 7, by virture of a biasing force from the clutch yoke 82. In addition, the clutch lever 81 is swingable around the pin 83 fixed to the doubling plate 13 and provided at the utmost end with an engaging portion, which engages with a stepped portion at a cutout formed at the doubling plate 13 to thereby hold the clutch lever 81 at the termination of its forward movement.

The fishing reel of the invention constructed as foregoing is provided at the outer periphery of a support cylinder 21a at the center of bearing housing 21 with a magnet ring 51 having a plurality of magnets 50 and mounted concentrically with the spool shaft 4, and at the spool 3 or spool shaft 4 with a cylindrical electric conductor 52 opposite to the magnets 50 and mounted concentrically with the spool shaft 4, thereby forming a magnetic force brake 5, and employs a cylindrical metallic bearing of a non-megnetic material, such as a sintered alloy, for the bearing 10 at the bearing housing 21, so that the bearing 10 will not be magnetized by magnets 50 00.

In the illustrated reel, four magnets 50 are disposed at phase angle differences of 90° and are alternate with the north pole and south pole.

The magnet ring 51 is provided with a recess 51b opening at the outside 51a of the ring 51 at a side of the cover 23, so that the magnets 50 are fitted into the recess 51b and the magnet ring 51 is fitted onto the outer periphery of support cylinder 21a, whereby the outside 51a is in close contact withthe inner surface of the bottom wall 21b, thus closing the opening at the outside 51a.

The bearing 10, which is formed mainly of the sintered alloy of porosity in a copper series, is permeated with a lubricating oil.

When the clutch lever 81 is operated to disconnect the clutch mechanism 7 to allow the spool 3 to freely rotate for casting, the electric conductor 52 provided at the spool 3 or the spool shaft 4, rotates together with the spool 3 within the magnetic field generated by the magnets 50, so that the magnetic flux passing the conductor 52 changes in the rotation direction of conductor 52, whereby an eddy current is generated in the conductor 52 and a magnetic force in a direction reverse to the rotation of conductor 52 is generated due to Fleming's left-hand rule, thereby exerting a braking action on the spool 3.

The bearing 10 at the magnetic force brake 5 side is not magnetized by the magnets 50, whereby no magnetic flux links across the bearing 10 and spool shaft 4. Hence, the spool 3 rotating together with the spool shaft 4 does not experience any increase in rotational resistance.

Also, the brake 5 is provided with a magnetic ring 53 for adjusting the braking action caused by the magnetic force, a control element 54 for the magnetic ring 53, and a holder 55 for maintaining an adjusted condition.

The magnetic ring 53 is disposed around the conductor 52 and concentrically with the spool shaft 4, is supported rotatably to the inner periphery of the bearing housing 21, and comprises a cylindrical member 53a of synthetic resin and a plurality of magnetic substances 53b provided at the outer periphery of the cylindrical member 53a, the cylindrical member 53a being provided with a pair of engaging projections 53c disposed circumferentially of the cylindrical member 53a and extending axially outwardly therefrom through windows 21c at the bearing housing 21. Each magnetic substance 53b is formed in a circular arc and is different in circumferential length so that, when the magnetic ring 53 is rotary-operated, a variation in width at the circumferential position of the magnetic substance 53b with respect to each magnet 50 is reduced, whereby the effective flux density is reduced in variation of width and the braking effect can be finely adjustable. In addition, each magnetic substance 53b is connected at one end annularly with another.

The control element 54 is supported rotatably to a support portion 21d provided at the outer surface of the bottom wall 21b of bearing housing 21 and has bifurcated engaging portions 54a engageable with the engaging projections 53c at the magnetic ring 53 respectively and a rotary-controlling knob 54b, so that the knob 54b is exposed outwardly to make the magnetic ring 53 controllable from the exterior.

The holder 55 is formed of a flexible material and has an engaging portion engageable with one of a number of splines 53d provided at the outer periphery of the magnetic ring 53, so that a mounting portion at one side is mounted to the side plate 22 and the engaing portion at the other side engages with one of the splines 53d, thereby being bent to disengage therefrom during the rotary control of magnetic ring 53.

Alternatively, the magnet ring 51 may be disposed at the outer periphery of conductor 52.

As seen from the above, the fishing reel of the invention can brake the spool by use of the magnetic force of the magnet and the bearing for the spool shaft is formed of the metallic bearing of non-magnetic material, thereby making it possible to prevent the bearing from being magnetized without complicating the construction of the reel and avoiding any increment in rotational resistance caused by the magnets against the rotation of the spool.

While an embodiment of the invention has been shown and described, the invention is not limited to the specific construction thereof, which is merely exemplary of the invention.

What is claimed is:
1. A fishing reel comprising,
   a reel body comprising a pair of first and second separated and opposing side frames which are provided with bearing housings each having a bearing,
   a spool shaft having a spool disposed between said side frames at said reel body, said spool shaft being supported rotatably by said bearings to said reel body,
   a drive mechanism for driving said spool shaft,
   a clutch mechanism for enabling said spool shaft to become freely rotatable with respect to said drive mechanism, and
   a brake mechanism for imparting a rotational resistance against free rotation of said spool shaft, said brake mechanism comprising a magnet ring having a plurality of magnets and an electric conductor which is cylindrical and rotatable together with said spool shaft, said magnet ring being fixed to said bearing housing at said second side frame, said electric conductor being disposed opposite to said magnet ring and rotatably within the magnetic field of said magnets, so that the magnetic force by said magnets exerts a braking action on said spool and spool shaft, said bearing at said second side frame being disposed within the magnetic field of said magnets at said brake mechanism and being formed of a metallic bearing comprising a non-magnetic material not magnetizable by said magnets.

2. A fishing reel according to claim 1, wherein said bearing housing at said second side frame has a support cylinder for said magnet ring, said support cylinder supporting at the outer periphery thereof said magnet ring and holding at the inner periphery thereof said metallic bearing.

3. A fishing reel according to claim 1, wherein said metallic bearing comprises a sintered alloy.

4. A fishing reel according to claim 3, wherein said metallic bearing comprises a sintered alloy in a copper series.

5. A fishing reel according to claim 3, wherein said metallic bearing is permeated with a lubricating oil.

6. A fishing reel according to claim 4, wherein said metallic bearing is permeated with a lubricating oil.

* * * * *